United States [11] 3,578,973

[72] Inventors Harry H. Dooley;
 Robert J. Doda; Arthur F. Mahon, Tucson,
[21] Appl. No. 805,042
[22] Filed Mar. 6, 1969
[45] Patented May 18, 1971
[73] Assignee American Atomics Corporation
 Tucson, Ariz.
 Continuation of application Ser. No.
 552,108, May 23, 1966, now abandoned.

[54] SELF-LUMINOUS LIGHT SOURCES EMPLOYING FIBER OPTICS
 21 Claims, 13 Drawing Figs.
[52] U.S. Cl. ................................................. 250/71,
 40/130, 240/1, 250/77, 250/106, 356/96
[51] Int. Cl. ........................................... G01n 23/00
[50] Field of Search ..................................... 250/71, 77,
 78, 106; 40/130 (K); 240/1 (EI); 350/96

[56] References Cited
 UNITED STATES PATENTS
| | | | |
|---|---|---|---|
| 1,974,832 | 9/1934 | Peterson | 250/77 |
| 2,227,861 | 1/1941 | Petrone | 40/130(K)UX |
| 2,354,367 | 7/1944 | Ford | 40/130(K) |
| 2,448,244 | 8/1948 | Arnold | 40/139(K)UX |
| 2,566,026 | 8/1951 | Hughes, Jr. | 340/380UX |
| 2,691,719 | 10/1954 | Marco | 240/1(EI)X |
| 3,026,436 | 3/1962 | Hughes | 250/71UX |
| 3,176,132 | 3/1965 | Muller | 250/71 |
| 2,507,909 | 5/1950 | Kaysen | 350/96X |
| 2,691,719 | 10/1954 | Marco | 240/1(EI)X |
| 3,018,362 | 1/1962 | Joyce | 350/96X |
| 3,409,770 | 11/1968 | Clapham, Jr. | 250/71 |

*Primary Examiner*—Archie R. Borchelt
*Attorney*—Christie, Parker & Hale

ABSTRACT: A self-luminous light source in which "fiber optic" light transmission media are utilized to transmit light from a radiation-excited light source to one or more light display locations at predetermined distances from the radiation-excited source. In one embodiment the radioactive material within the source is completely surrounded by radiation shielding material such as lead and the "fiber optic" media follow a curved path within the shield. Other embodiments include apparatus for selectively presenting light of various colors and intensities to the input ends of the "fiber optic" light transmission media.

Patented May 18, 1971

INVENTORS.
HARRY H. DOOLEY
ROBERT J. DODA
ARTHUR F. MAHON
BY Christie Parker & Hale
ATTORNEYS.

Patented May 18, 1971

INVENTORS.
HARRY H. DOOLEY
ROBERT J. DODA
ARTHUR F. MAHON

BY Christie Parker Hale
ATTORNEYS.

Patented May 18, 1971

INVENTORS.
HARRY H. DOOLEY
ROBERT J. DODA
ARTHUR F. MAHON

BY Christie Parker and Hale
ATTORNEYS.

SELF-LUMINOUS LIGHT SOURCES EMPLOYING FIBER OPTICS

This is a continuation of a copending application, Ser. No. 552,108, filed on May 23, 1966, and now abandoned.

This invention relates to self-luminous light sources of the type which utilize a phosphor excited by radioactive material and more particularly to such light sources employing light transfer media in which light is conducted by means of total internal reflection.

Prior art self-luminous sources have utilized phosphor coated surfaces within cavities containing a colorless beta-emitting gas. An improved self-luminous source is described, for example, in the copending Pat. application of Theo. F. Linhart, Jr., Robert J. Doda and Arthur F. Mahon, Ser. No. 746,145, filed on July 19, 1968 and assigned to the assignee of the present application.

The beta emitter may be a radioisotope such as krypton 85, tritium, PM-147, C-14, T1-204, or Sr-90, for example. Illumination is provided as a result of impingement of the beta emissions upon the phosphor within the source. Infrared and ultraviolet as well as visible light may be generated. Such light sources are extremely useful in that they have no bulbs or batteries to replace, no wiring to maintain, no fuel to replenish and provide long and useful service, their half-life being from 7 to 10 years.

For a particular krypton 85 light source configuration, the intensity of light produced is directly proportional to the amount of radioactive gas used. The gas, however, besides generating betas, also generates gammas which provide an external field and a radiation danger. This radiation danger therefore has limited the amount of gas which may be used, and consequently has limited the intensity of illumination produced by such sources.

An advantage of the present invention is that it provides a radiation-excited self-luminous light source in which the radiation danger is greatly reduced.

Complete geometric shielding of the radioactive material has not been possible in previous radiation-excited self-luminous light sources. This has resulted since no shielding could be placed in the light path between the source of light generation and the exterior of the unit. As a result, an observer of light generated by such a unit would observe light transmitted via an unshielded path in which the radiation level is relatively high.

A principal advantage of the present invention is that it provides a radiation-excited self-luminous light source in which the source of radiation is completely shielded, in a geometric sense.

The radiation danger inherent in previous radiation-excited self-luminous light sources has limited the uses of such sources. They have generally not been suitable for uses wherein human beings would be in prolonged close contact with the sources. Additionally, governmental regulations which set forth permissible levels of radiation impose limitations upon such uses. Thus, for example, it has not heretofore been feasible to use such sources for the illumination of aircraft instrument panels. It is known, however, that the radiation level established by a source of radiation decreases in accordance with the square of the distance from the source. As a result, the removal of the location at which light is displayed to an observer from the location of the radiation source could advantageously effect a significant reduction in the radiation level at the display location thereby enabling light sources to be used for purposes not heretofore feasible.

Another advantage of the present invention is that it provides a radiation-excited self-luminous light source in which the illumination display location may be removed by a predetermined distance from the radiation source location.

Previous self-luminous light sources of the type discussed generate light of unchangeable color and intensity. The particular color and intensity are governed by the particular phosphor or phosphors used, by the particular radioactive gas used, and by the concentration of the gas. It has not been possible to change the inherent color of such a source. Neither has it been possible to continuously vary the intensity of the source or to turn the source on and off.

Another advantage of the present invention is that it provides a radiation-excited self-luminous light source in which any of a number of different colors may be displayed from a single illumination display location.

Still another advantage of the present invention is that it provides a radiation-excited self-luminous light source in which the intensity of light produced may be varied continuously from an off condition to the maximum intensity condition.

Still another advantage of the present invention is that it provides a radiation-excited self-luminous light source in which light generated by a single source of radiation may simultaneously be displayed at a plurality of illumination display locations.

In brief, the above and other advantages of the present invention are achieved by radiation-excited self-luminous light sources in which light transfer media of the "fiber optics" type are employed.

As used herein "fiber optics" light transfer media include all such media in which light is conducted by means of total, or substantially total, internal reflection. "Fiber optic" transfer media may be utilized to transport an optical image over a tortuously curved path. Although a curved "fiber optic" medium appears to bend light rays passing through it, in actuality the light follows a zigzag path in which it travels in straight lines but caroms repeatedly off the internal surface of the medium. This phenomenon is known as total internal reflection and occurs whenever the angle of incidence of light striking the medium is greater than a critical angle, which is determined by the ratio of indices of refraction of the "fiber optic" medium and the internal light conducting medium. This phenomenon is described, for example, in an article by N. S. Kapany entitled "Fiber Optics" appearing in the magazine Scientific American, Nov. 1960, pp. 72—81.

The term "fiber optics" is often used to refer to bundles of optical fibers which may be glass or plastic. It is used herein also to refer to a "light pipe" which is a single larger unit rather than a bundle of fibers and is essentially a single large diameter fiber or rod.

The bundles of optical fibers are generally more efficient than the "light pipe" in their light transmission properties. "Image conduit" is a particular type of optical fiber device in which point-for-point light transmission is achieved thereby enabling "image conduit" to transmit images. In other "fiber optic" transmission media the light transmitted at the output end is a mixture of the light received at the input end. "Image conduit" also provides a wider angled output than do other "fiber optic" media, that is, its output is similar to having another light source at the output end. Lenses and other optical techniques may advantageously be used in conjunction with the wide-angled output of "image conduit". "Image conduit" may, for example, comprise a bundle of glass fibers which are sheathed in other glass and fused together or bundles of plastic fibers sheathed in other plastic and fused together.

"Fiber optic" light transmission media of the type referred to are commercially available in a variety of sizes and from a number of sources. For example, glass media are presently available from the American Optical Company and plastic media are available from E. I. duPont de Nemours & Co.

DuPont presently sells plastic "fiber optic" media under the trade mark CROFON. The ends of CROFON light guides may be coated with almost any color desired. The plastic CROFON material has been submitted to radiation dosages of $10^5$ rads and while turning brown, recovers its normal color after a period of time. Additionally, the CROFON material may be welded to form solid diameter cables of one-half inch or more.

The advantages recited above may be achieved by self-luminous light sources in which "fiber optics" light transfer media are utilized to transmit to a predetermined illumination display location light which is generated by the impingement of radiation upon a phosphor. In one embodiment of the present invention the radioactive material is completely surrounded by radiation shielding material, such as lead. Generated light may be transmitted to an illumination display location by "fiber optic" means, even though the radioactive material is shielded, since the "fiber optic" means may transmit the generated light to the display location over a curved path. Additionally, by removing the illumination display location a predetermined distance away from the radioactive material, the "fiber optics" media enable a significant reduction in the radiation level at the display location to be achieved. Furthermore, by presenting to the input end of a "fiber optic" light transfer medium light generated by one of a number of radiation-excited sources which generate light of different colors, these different colors may selectively be displayed at a single light display location. Moreover, by providing means for varying the intensity of light entering the input end of a "fiber optic" light-transfer medium from a constant intensity light source, the intensity of light available at a display location may be caused to vary. Additionally, a plurality of "fiber optic" light transfer media may be utilized to transmit light from a single radiation-excited source to a plurality of display locations.

For a complete understanding of the invention, reference should be made to the accompanying drawings in which.

Figure 1A:
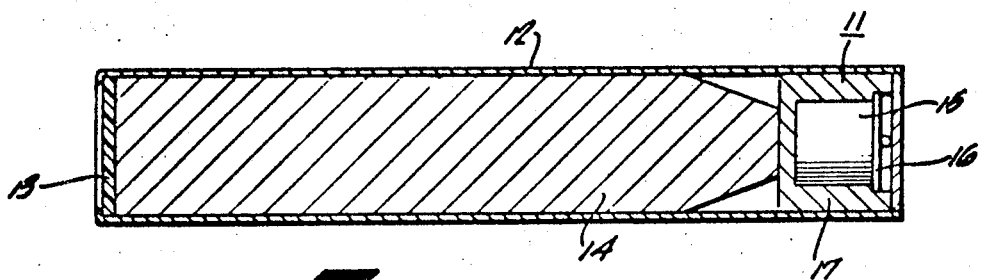
FIGS. 1A and 1B depict a marker light employed a radiation-excited self-luminous light source and a "fiber optic" "light-pipe"
Figure 1B:
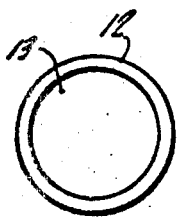

FIGS. 1A and 1B depict a marker light employing a radiation-excited self-luminous light source and a "fiber optic" "light-pipe." FIG. 1A depicts a side view of the marker light whereas FIG. 1B depicts an end view. Self-luminous light source 11 is shown affixed within a cylindrical metal housing 12. The light source 11 is affixed at one end of the housing while a diffusion lens 13 is affixed to the other end of the housing. A "fiber optic" "light-pipe" 14 is positioned within the housing 12 and extends between the self-luminous light source 11 and the diffusion lens 13. The "light-pipe" 14 serves to transmit light generated by light source 11 to the diffusion lens 13 by means of total internal reflection. The light source 11 has a gastight chamber 15 within which a layer of phosphor material 16 is coated and within which a radioactive beta emitting gas is sealed. The gas is sealed by means of a glass window 17 through which the generated light is transmitted to the "light-pipe" 14. The self-luminous light source 11 is shown schematically in FIG. 1A, but may advantageously be of the type depicted in the copending application, SER. No. 746,145, referred to previously. The "light-pipe" 14 not only serves to transmit light from source 11 to the lens 13 on the surface of housing 14 but also serves to increase the luminous diameter of the light. Thus, the "light-pipe" is shown to contact the light source 11 at an angle. The angle at which the "light-pipe" joins the light source is critical in that the proper angle prevents light loss within the "light-pipe" itself. Thus, if the proper angle is utilized, all light will be transmitted from one end of the pipe to the other by means of total internal reflection. This angle will differ for different size units and can be determined either theoretically or practically. The theoretical determination can be determined in accordance with the principles of geometrical optics. In an embodiment in which the luminous diameter of the light source 11 is one-half inch and the luminous diameter of the diffusion lens 13 is 1 inch, the angle at which the "light-pipe" 14 joins light source 11 will be approximately 15½° as measured with the horizontal.

Figure 2:
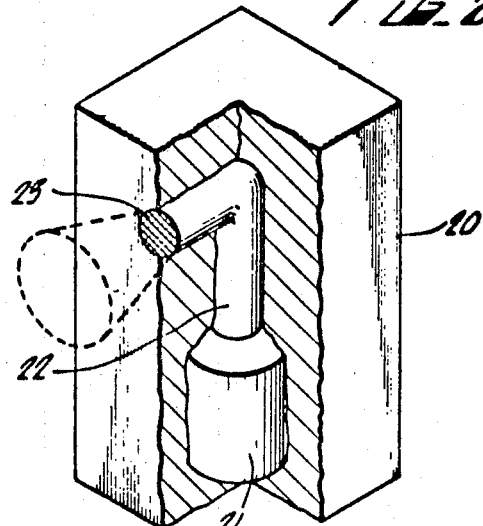
FIG. 2 depicts an embodiment of the present invention in which a single radiation-excited light source is completely surrounded by radiation shielding material.

FIG. 2 depicts an embodiment of the present invention in which a single radiation-excited light source is completely surrounded by radiation-excited light source is completely surrounded by radiation shielding material. FIG. 2 depicts a lead block 20 with a portion of the block broken away for purposes of illustrative clarity. Within the block 20 is located a radiation-excited self-luminous light source 21 and a "fiber optic" unit 22 extending form the light source 21 to an illumination display location 23 on the surface of block 20. The "fiber optic" unit 22 bends through approximately 90° in going from source 21 to display location 23. As a result of the circuitous route traversed by "fiber optic" unit 22, it may be seen that the radiation-excited light source 21 is completely surrounded by the lead block 20. In other words, no straight path exists for radiation from source 21 to the exterior of block 20. The light can travel through block 20 in a bent path by virtue of "fiber optic" unit 22, but radiation can only travel in a straight line. Accordingly, all the radiation from source 21 is absorbed, so to speak, in the lead shielding. As a result of this complete geometric shielding of source 21, a substantial reduction in the level of radiation at the illumination display location 23 is achieved. The block 20 may, for example, be of cast lead with cavities machined therein for the insertion of the source 21 and "fiber optic" unit 22. Alternatively, block 20 could be formed by means of powder metallurgy using tungsten shielding rather than lead. The block 20 could then be formed in a mold and subsequently fired, with two mating parts thereby being formed.

Figure 3A:
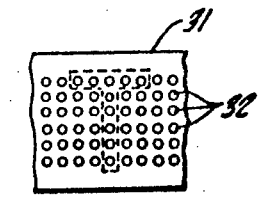
FIGS. 3A and 3B depict an informational sign utilizing shielded light sources of the type depicted in FIG. 2.
Figure 3B:
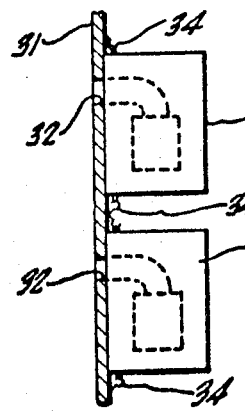

FIGS. 3A and 3B depict an informational sign utilizing shielded light sources such as that shown in FIG. 2. FIG. 3A shows a broken-away segment of an informational sign 31. The sign 31 has a plurality of holes 32 therein with the holes arranged in rows and columns. An arrangement of such holes which is utilized to form the letter T is shown by a dashed line outline in FIG. 3A. As shown in FIG. 3B, which represents a broken-away side view of sign 31, individual shielded light units 33 which may be identical to the unit shown in FIG. 2 may be removably attached to the rear portion of sing 31. For illustrative purposes the side view of FIG. 3B is shown in a larger scale than the front view of FIG. 3A. The units 33 are schematically shown in FIG. 3B to be removably affixed to sign 31 by means of hooks 34. Other means for removably attaching such units 33 to sign 31 would, of course, be used in the actual construction of such a sign.

The shielded sources 33 may be removably affixed to sign 31 in order to form the letter T, as indicated in FIG. 3A, or may be arranged on sign 31 to form any desired alphanumeric characters. By making the sources 33 removable, the information depicted on sign 31 may be changed and the units 33 may be replaced whenever necessary. In instances where it is not advantageous to change the information conveyed by the sign, the holes 32 need only be arranged in accordance with the desired information to be conveyed. In such signs where it is not advantageous to be able to replace the sources 33, the sources may be permanently affixed to the sign 31.

Informational signs utilizing shielded radiation-excited light sources may be advantageously used, for example, as highway signs. Each individual light source is protected by its lead shield. Should any damage occur to the illumination display location adjacent the holes 32, such as by shooting or other Vandalism to which highway signs are often subjected, no damage would be caused to the light source 31 itself by reason of its being completely shielded. Additionally, no radiation hazard would be presented as a result of such damage to the sign because the shielded radiation source 31 is protected by its lead housing.

Figure 4:
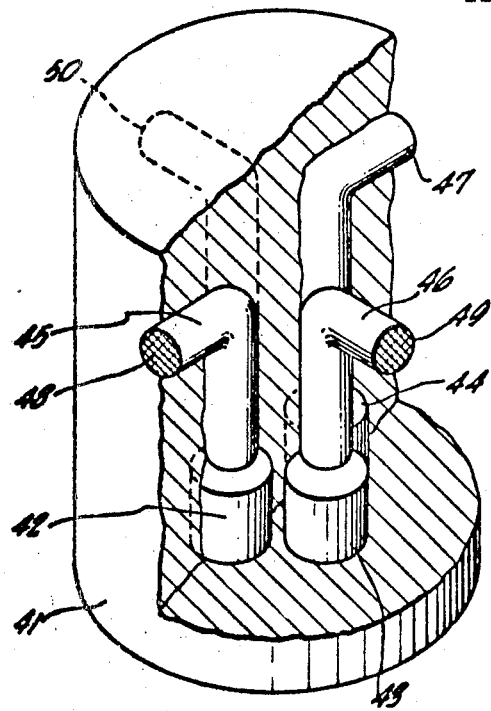
FIG. 4 depicts an embodiment of the present invention in which a plurality of radiation-excited light sources are housed within a single housing in which they are completely surrounded by radiation shielding material.

FIG. 4 depicts an embodiment of the present invention wherein a plurality of radiation-excited light sources, each having a "fiber optic" light transmission unit associated therewith, are housed within a single lead shield. Cylindrical shield 41 is shown in a broken-away view whereby sources 42, 43 and 44 are made visible. "Fiber optic" units 45, 46 and 47 transmit light generated by sources 42, 43 and 44, respectively, to illumination display locations on the surface of housing 41. Illumination display locations 48 and 49 at the output ends of "fiber optic" units 45 and 46 are shown in FIG. 4, as is a "fiber optic" unit 50 shown in dotted form. "Fiber optic" unit 50 transmits light from a radiation-excited source hidden from view in FIG. 4. Each of the radiation-excited light sources 42, 43 and 44 may advantageously generate light of different colors. The embodiment shown in FIG. 4 may, therefore, advantageously be used as a signal light wherein "fiber optic" units 46 and 50 transmit green light, while "fiber optic" units 47 and 48 transmit red light. Such a signal light could, for example, be rotatably mounted on a base and used as a railroad signal light. Such a railroad light could then be manually rotated in order to project the green or red light in the desired direction.

Figure 5:
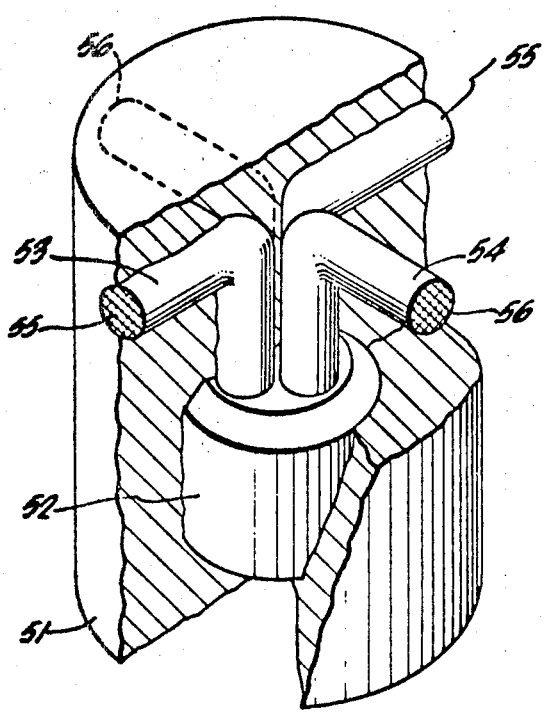
FIG. 5 depicts an embodiment of the present invention in which a plurality of "fiber optic" light transmissive units are used to transmit light from a single radiation-excited shielded light source.

FIG. 5 depicts another embodiment of the present invention in which a plurality of "fiber optic" light transmission units are used to transmit light from a single radiation-excited light source. Lead cylinder 51 is shown in FIG. 5 to have a single radiation-excited light source 52 positioned therein. "Fiber optic" light transmission units 53, 54, 55 and 56 transmit light generated by source 52 to illumination display locations on the surface of lead cylinder 51. Illumination display locations 55 and 56 on the surface of cylinder 51 are depicted in FIG. 5. Each of the "fiber optic" light transmission units 53 through 56 transmits light from source 50 to an illumination display location via a circuitous route. Each of the paths through which the light is transmitted is shown to bend through an angle of approximately 90°. Thus, the radiation-excited light source 52 is also completely shielded by lead housing 51.

Figure 6A:
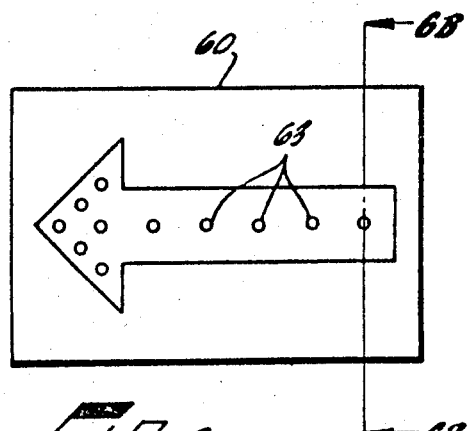
FIGS. 6A, 6B, 7 and 8 depict applications of the shielded sources of FIGS. 4 and 5.
Figure 6B:
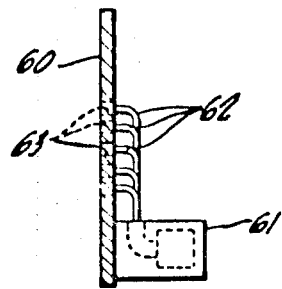

FIG. 6A depicts a directional sign and FIG. 6B depicts a cross section of this sign viewed along the plane indicated in FIG. 6A. The sign of FIGS. 6A and 6B is illuminated by a single shielded light source 61 similar to that shown in FIG. 5. A plurality of "fiber optic" light transmission media 62 transmit light from source 61 to a plurality of illumination display locations 63 on the face of sign 60. These illumination display locations are arranged on the face of sign 60 to illuminate a directional arrow which appears therein. Alternatively, other similar directional or locational signs could also be illuminated in this manner with the illumination of a plurality of display locations being achieved by a single shielded light source.

Figure 7:
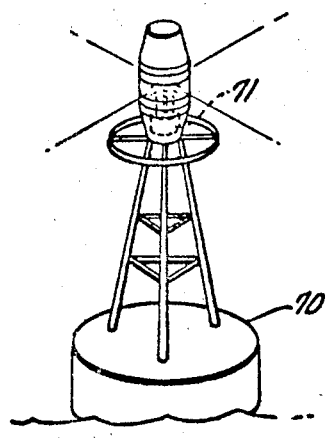

FIG. 7 depicts a navigational buoy utilizing a shielded light source similar to that shown in FIG. 5. Light buoy 70 is shown to include a single shielded light source 71 in an upper portion thereof. The light output from such a buoy can be directed in a horizontal plane and made to encompass up to 360°.

Although the buoy shown in FIG. 7 includes a shielded light source in an upper portion thereof, it may be advantageous to use the water itself as a bottom shield. In such an arrangement, a radiation-excited light source would be positioned in the buoy so that it was beneath the surface of the water. Shielding would be provided above the light source and around its sides but would not need to be provided beneath the light source. "Fiber optic" units would be utilized to transmit light from the source to the display locations on the buoy.

Figure 8:
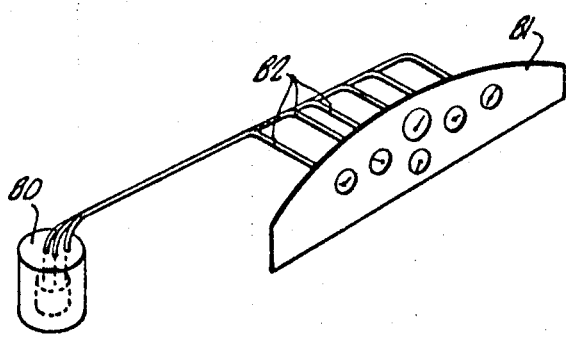

FIG. 8 depicts an instrument panel illuminated by means of a shielded light source similar to that depicted in FIG. 5. The instrument panel, for example, may be that of an aircraft or automobile. Shielded light source 80 is utilized to illuminate instrument Shielded panel 81 by means of "fiber optic" light transmission units 82. Since light source 80 is shielded, the illumination of panel 81 may be achieved while the radiation level established in the vicinity of panel 81 is maintained at a low level. The level may easily be maintained at a level sufficiently low to enable human beings to remain in prolonged close contact with panel 81. In addition to the shielding of light source 80, the radiation level established in the vicinity of panel 81 is also diminished by reason of the displacement of panel 81 from light source 80. Since the radiation level established by a radiation source is known to decrease in accordance with the square of the distance from the source, the displacement of panel 81 from source 80 also advantageously achieves a reduction in radiation level.

Figure 9:
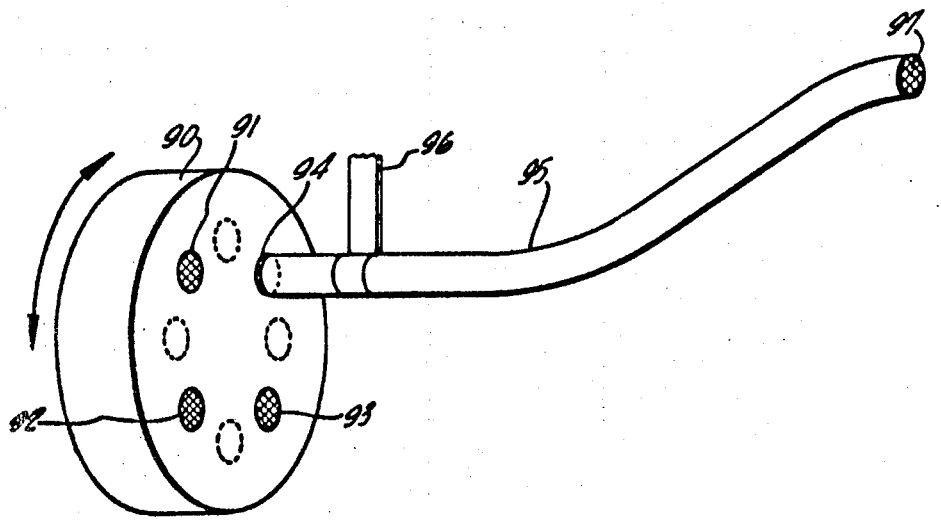
FIG. 9 depicts an arrangement whereby light of different colors, generated by a plurality of radiation-excited light sources, may be displayed from a single illumination display location.

FIG. 9 depicts an arrangement whereby light of different colors, generated by a plurality of radiation-excited light sources, may be displayed from a single illumination display location. FIG. 9 depicts a rotatable member 90 within which are positioned radiation-excited light sources 91, 92, 93 and 94. The light sources 91 through 94 may utilize different phosphor materials and, consequently, generate light of different colors. The sources 91 through 94 are circumferentially positioned on member 90 and a "fiber optic" light transmission unit 95 is fixedly mounted, by means of bracket 96, such that its input end is in close proximity to member 90 and, as depicted in FIG. 9, is directly opposite light source 94. Consequently, light generated by source 94 is transmitted by means of the "fiber optic" unit 95 to its output end 97. Light displayed at output end 97 is, of course, of the same color as that generated by source 94. Light of a different color may be displayed form output end 97 by means of rotation of member 90 until one of the sources 91 through 93 is opposite the input end of unit 95. Additionally, by rotating member 90 to a position where a blank spot, indicated in FIG. 9 by dashed circles, is opposite the input end of unit 95, the light displayed at output end 97 may be turned off. Rotation of member 90 may thus be utilized both to turn on and off the light displayed at output end 97 and to determine the color of light displayed at output end 97.

Figure 10:
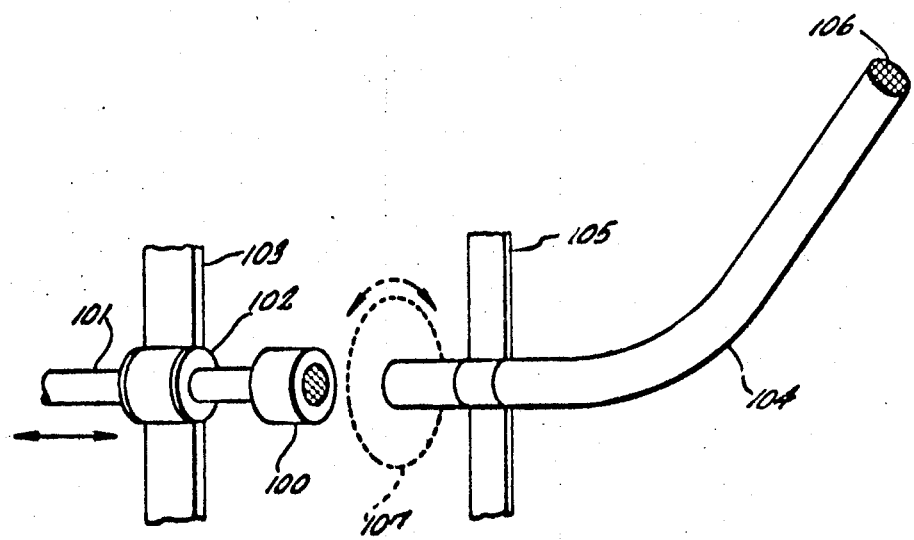
FIG. 10 depicts an arrangement whereby light generated by a radiation-excited light source may be continuously varied in intensity.

FIG. 10 depicts an arrangement whereby light generated by a radiation-excited light source may be varied continuously in intensity. FIG. 10 depicts a radiation-excited light source 100 mounted on a rod 101 which is slidably movable in a horizontal direction within bearing 102. Bearing 102 in turn is mounted within a housing, not shown, by means of bracket 103. The input end of a "fiber optic" probe unit 104 is fixedly mounted along the axis of rod 101 by means of bracket 105. By varying the distance between source 100 and the input end of probe 104, and, the amount of light received by the input end of probe 104 and, consequently, transmitted from its output end 106 may be continuously varied. This results since a greater portion of the light generated by source 100 escapes the probe 104 as source 100 is moved further away from the input end of the probe. Another means for modifying the intensity of light displayed at output end 106 would be to utilize a neutral density filter between the source 100 and input end of probe 104. Such an optional filter 107 is shown by dashed lines in FIG. 10. A neutral density filter has no color associated therewith but, rather, diminishes the amount of light transmitted regardless of color. By using a filter 107 of varying density along its circumference, it is possible by means of rotating the filter to turn on and off and to vary the intensity of light displayed at output end 106.

It is to be understood that all of the light sources described herein are intended to include sources which generate light in the infrared and ultraviolet ranges, as well as those which generate visible light.

What have been described are considered to be illustrative embodiments of the present invention. Accordingly, it is to be understood that various and numerous other arrangements may be devised by one skilled in the art without departing from the spirit and scope of this invention.

Thus, for example, shielded light sources, as described herein, might be used in the manufacture of a shielded light standard. The light standard might be a color standard in which a particular wavelength of light is produced, or it might be a brightness standard. Since "image conduit" has a somewhat higher transmission efficiency than do other "fiber optic" light transmission media, "image conduit" could advantageously be used in conjunction with such a standard. "Image conduit" may also advantageously be used in conjunction with shielded sources when optical techniques are to be performed at the output end of the "fiber optic" unit. "Image conduit" is preferable when such optical techniques are to be used, since it provides a better angle of output light than do other "fiber optic" media. As a result, light from the output end of "image conduit" may be treated as an optical source. Thus, for example, a lens adjacent the output end of an "image conduit" having a first luminous diameter, may be utilized to display light at a second luminous diameter larger than the first, to concentrate light at a second luminous diameter smaller than the first, or to collimate light appearing at a second luminous diameter which is the same size as the first.

Additionally, radioisotopes such as tritium and promethium 147 which are weak beta emitters may advantageously be used for certain applications as the phosphor exciting material within a shielded light source. Since these isotopes are weak beta emitters, they are easily shielded and may enjoy numerous uses. Thus, for example, the illumination of gun sights, reticles, and compasses, by means wherein the source is independent from the area of view, removes the objection arising from the possibility of release of radioactive material to the environment as a result of damage to the source. This objection has heretofore held up numerous military applications of self-luminous radiation-excited light sources.

We claim:

1. A self-luminous lighting arrangement comprising:
a radiation-excited self-luminous light source, the source producing adjacent to it a first level of radiation that is harmful to humans;
"fiber optic" light transmission means for transmitting light from one end to the other end by substantially total internal reflection; and
means for supporting the light transmission means such that the one end is positioned adjacent the light source and the other end is positioned at a remote light display location where a second level of radiation from the source exists that is harmless to humans.

2. A self-luminous light source comprising:
a gastight chamber having a layer of phosphor material and a radioactive beta emitting gas therein, the gas being of a concentration and pressure to excite the phosphor to luminescence and to emit radiation at a level that is harmful to humans;
a window in the chamber through which light emanates;
a housing enclosing the chamber;
a light display arrangement located on the surface of the housing at a point where the level of radiation from the gas is harmless to humans; and
"fiber optic" light transmission means for transmitting light from one end to the other end by substantially total internal reflection, the light transmission means being positioned within the housing such that the one end is adjacent the window and the other end is adjacent the display arrangement.

3. A self-luminous light source according to claim 2 in which the window has a first luminous diameter, a diffusion lens of a second luminous diameter is positioned at the display location, and the light transmission means comprises a light pipe having an input end of a diameter substantially equal to the first luminous diameter and an output end of a diameter substantially equal to the second luminous diameter.

4. A self-luminous light source comprising:
a gastight chamber having a layer of phosphor material and a radioactive beta emitting gas therein, the gas being of a concentration and pressure to excite the phosphor to luminescence and to produce radiation at a level that is harmful to humans;
a window in the chamber through which light and radiation emanate within a restricted solid angle;
a light display arrangement spaced from the gastight chamber outside of the solid angle within which light and radiation emanates through the window; and
"fiber optic" light transmission means for transmitting light from one end to the other end by substantially total internal reflection, the one end of the light transmission means being adjacent the window of the chamber to intercept the light therefrom and the other end of the light transmission means being adjacent the light display arrangement to illuminate it.

5. A self-luminous light source according to claim 4 in which shielding means are provided completely surrounding the chamber except for the space occupied by the light transmission means.

6. A self-luminous light source according to claim 4 in which the light emanates through the window substantially in one direction and the light at the display arrangement is transmitted in a direction which is approximately 90° removed from the direction of light emanating through the window.

7. A self-luminous light source comprising:
a gastight chamber having a layer of phosphor material and a radioactive beta emitting gas therein, the gas being of a concentration and pressure to excite the phosphor to luminescence and to produce radiation at a level that is harmful to humans;
a window in the chamber through which light and radiation emanate;
"fiber optic" light transmission means for transmitting light from one end to the other end by substantially total internal reflection, one end of the light transmission means being disposed adjacent the window and the other end of the light transmission means being so disposed that a bend is formed in the light transmission means between the ends; and
radiation shielding means for completely surrounding the gastight chamber except for the space occupied by the light transmission means such that no straight path for radiation from the window exists to the exterior of the shielding means.

8. A self-luminous light source according to claim 7 in which the shielding means comprises a radiation absorbing housing, the housing having a cavity therein in which the gastight chamber is located and a curved channel therein in which the light transmission means is located.

9. A self-luminous buoy comprising:
a floatable housing floating in a liquid;
a radiation-excited self-luminous light source located in the housing, the source producing radiation at a level that is harmful to humans;
at least one light display arrangement from which light emanates in a substantially horizontal direction;
"fiber optic" light transmission means for transmitting light from one end to the other end by substantially total internal reflection, the one end of the light transmission means being disposed adjacent the source and the other end of the light transmission means being disposed adjacent the light display arrangement and the length of the light transmission means being bent; and
radiation shielding means surrounding the source except for the space occupied by the light transmission means such that no straight path exists for radiation from the source to the exterior of the shielding means.

10. A self-luminous sign comprising:
a support member having a plurality of light display locations;
a plurality of self-luminous light sources each affixed to the support member and arranged to form at least one alphanumeric character;

each of the sources comprising a radiation-excited self-luminous light generator that produces radiation at a level harmful to humans;

"fiber optic" light transmission means for transmitting light from one end to the other end by substantially total internal reflection, one end of the light transmission means being disposed adjacent the generator and the other end of the light transmission means being disposed adjacent one of the light display locations; and radiation shielding means completely surrounding the light generator except for the space occupied by the light transmission means such that no straight path exists from the generator for radiation to the exterior of the radiation shielding means.

11. A light system comprising:

a radiation-excited self-luminous light generating means, a first radiation level harmful to humans being established immediately adjacent the light generating means;

a first light display means located a predetermined distance from the light generating means;

radiation shielding means disposed between the light generating means and the light display means to establish a second radiation level immediately adjacent the light display means;

the second radiation level being substantially less then the first radiation level and harmless to humans; and "fiber optic" light transmission means for transmitting light from one end to the other end by substantially total internal reflection, the one end of the light transmission means being disposed adjacent the light generating means and the other end of the light transmission means being disposed adjacent the light display means to connect the light generating means and the light display means.

12. A lighting system according to claim 11 in which the first light display means and a plurality of additional light display means are affixed to an instrument panel and in which the "fiber optic" light transmission means transmits light to all of the light display means.

13. A variable-color self-luminous light source comprising:

a plurality of radiation-excited self-luminous light generating means each of which generates a different color light and radiation at a level that is harmful to humans;

a light display arrangement located at a point where the level of the radiation from the light generating means is harmless to humans;

"fiber optic" light transmission means for transmitting light from one end to the other end by substantially total internal reflection, the one end of the light transmission means being disposed adjacent one of the light generating means and the other end being disposed adjacent the light display arrangement; and means for selectively positioning each of the light generating means adjacent the one end of the light transmission means.

14. A variable-color self-luminous light source according to claim 13 in which the input end of the light transmission means is fixedly mounted and in which the positioning means comprise a rotatable holder in which the light generating means are affixed, rotation of the holder sequentially positioning each of the light generating means opposite the end of the transmission means.

15. A self-luminous light source according to claim 14 in which the rotatable holder has a blank location which may be positioned adjacent the input end of the transmission means, the positioning of the blank location opposite the input end of the transmission means being effective to turn off the light source.

16. A variable-intensity self-luminous light source comprising:

a radiation-excited self-luminous light generating means that produces a level of radiation harmful to humans;

a light display arrangement located at a point where the level of radiation from the light generating means is harmless to humans;

"fiber optic" light transmission means for transmitting light by substantially total internal reflection from a light input end to a light output end, the light input end being positioned adjacent the light generating means and the light output end being positioned adjacent the light display arrangement; and means for selectively adjusting the distance between the light transmission means and the light generating means to enable variable selected amounts of the light emanating from the light generating means to enter the input end of the light transmission means.

17. A variable-intensity self-luminous light source according to claim 16 in which the input end of the light transmission means is fixedly mounted and the adjusting means comprises means for moving the light generating means selectively toward and away from the input end of the light transmission means.

18. A self-luminous light source comprising:

a radiation-excited self-luminous light generating means that produces a level of radiation harmful to humans;

a plurality of light display arrangements located at a point where the level of radiation from the light generating means is harmless to humans; and a plurality of "fiber optic" light transmission means for transmitting light from one end to the other end by substantially total internal reflection, one end of the light transmission means being disposed adjacent the light generating means and the other end of the light transmission means being disposed adjacent the respective light display locations.

19. A self-luminous light source comprising:

a plurality of radiation-excited self-luminous light generating means each producing a level of radiation that is harmful to humans;

a plurality of light display arrangements located where the level of radiation from all the light generating means is harmless to humans; and a plurality of "fiber optic" light transmission means for transmitting light from one end to the other end by substantially total internal reflection from respective ones of the light generating means to respective ones of the light display locations, one end of each light transmission means being disposed adjacent one light generating means and the other end of each light transmission means being disposed adjacent one display arrangement.

20. A self-luminous light source according to claim 19 in which each light generating means generates a different color.

21. A self-luminous sign comprising:

a display member having a plurality of display locations thereon, the display locations arranged to form an informational character;

a single radiation-excited self-luminous light source that produces radiation at a level harmful to humans;

a plurality of "fiber optic" light transmission means for transmitting light from one end to the other end by substantially total internal reflection, a bend being formed in the light transmission means between its ends, the one end of each light transmission means being disposed adjacent the source and the other end of each light transmission means being disposed adjacent one of the display locations; and radiation shielding means completely surrounding the light source except for the space occupied by the light transmission means such that no straight path for radiation from the source exists to the exterior of the shielding means.